A. M. THOMSON.
SCREW THREAD MILLING MACHINE.
APPLICATION FILED AUG. 2, 1915.
1,200,046.
Patented Oct. 3, 1916.
5 SHEETS—SHEET 5.
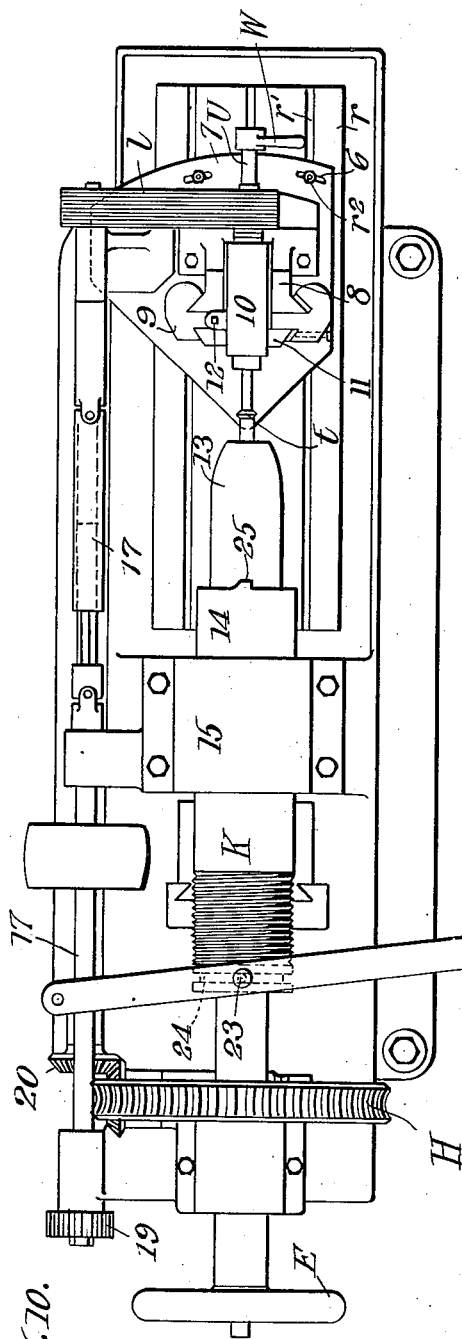
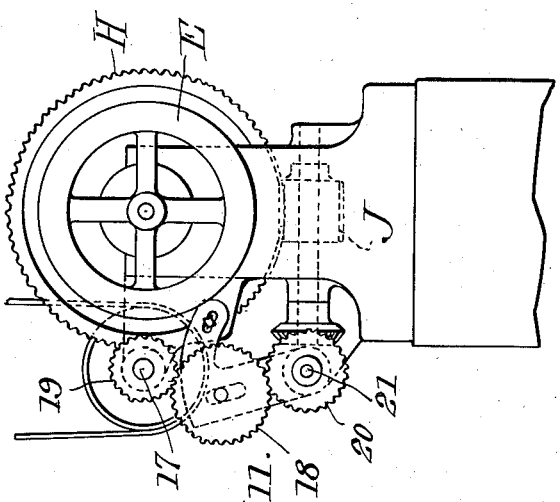

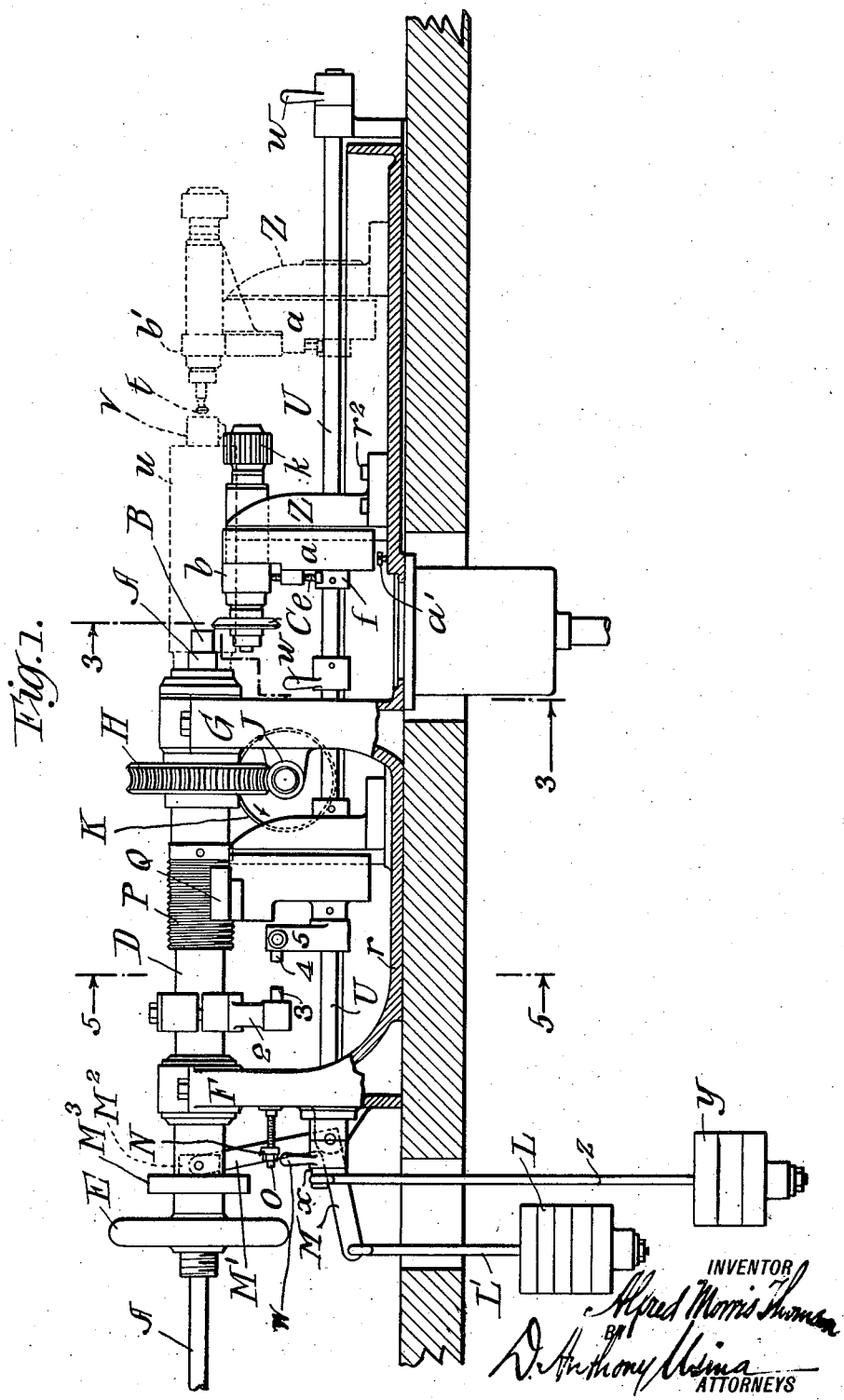

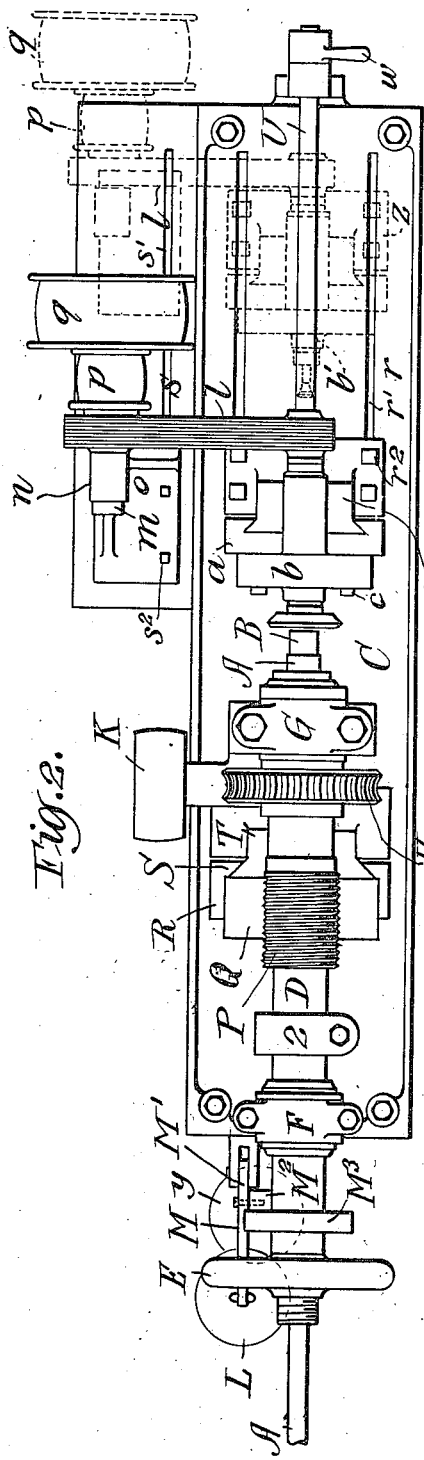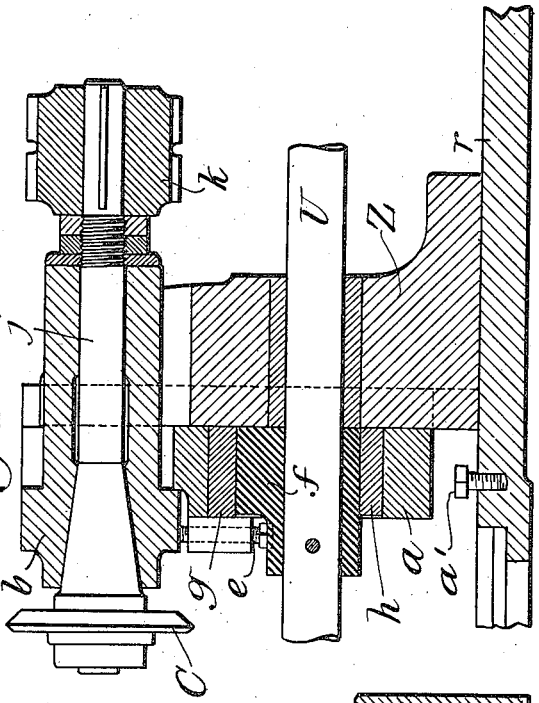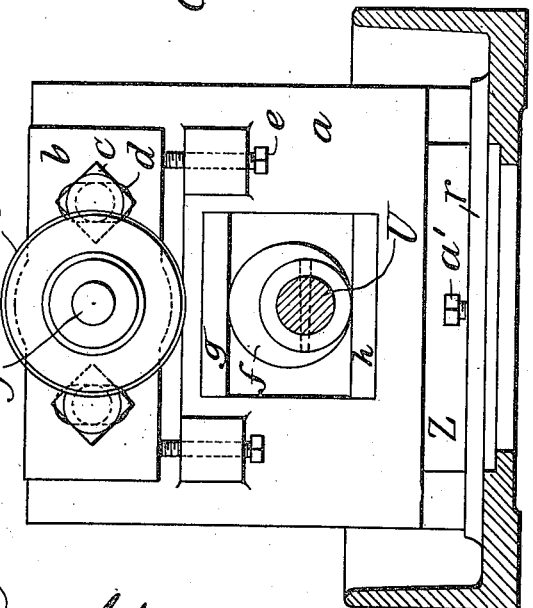

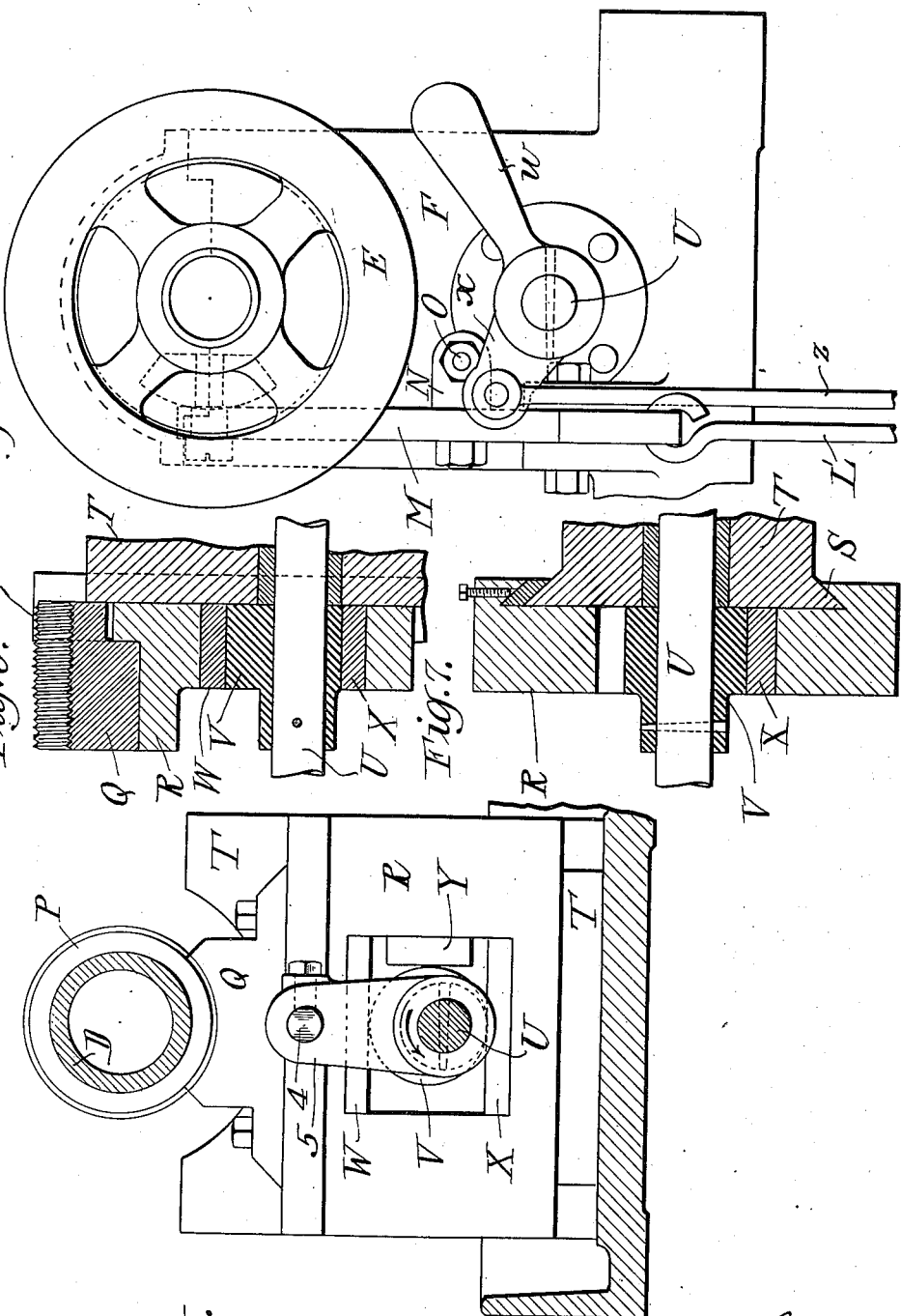

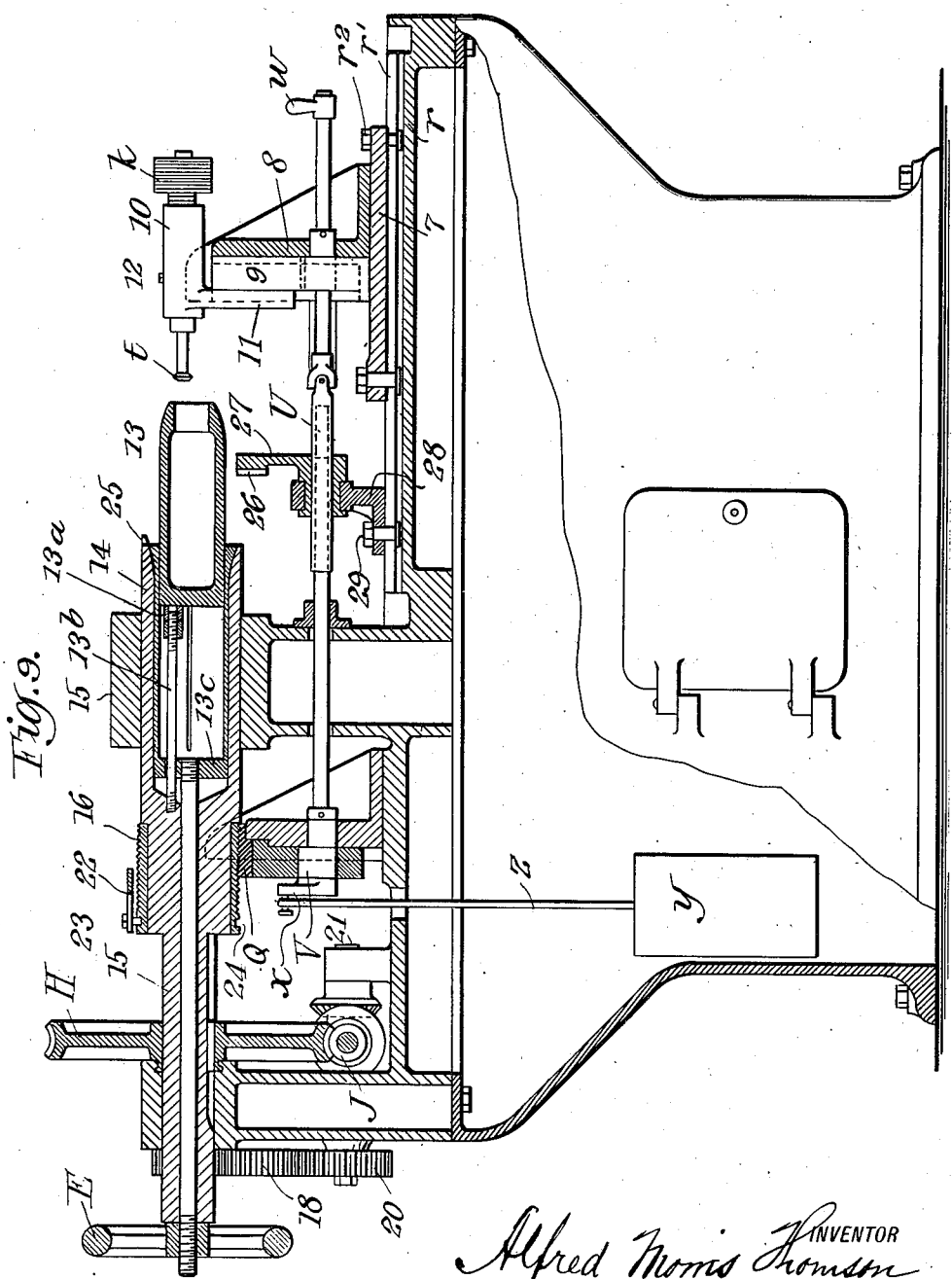

UNITED STATES PATENT OFFICE.

ALFRED MORRIS THOMSON, OF NEWARK, NEW JERSEY.

SCREW-THREAD-MILLING MACHINE.

1,200,046.  Specification of Letters Patent. Patented Oct. 3, 1916.

Application filed August 2, 1915. Serial No. 43,252.

*To all whom it may concern:*

Be it known that I, ALFRED MORRIS THOMSON, a subject of the King of Great Britain, residing in Newark, New Jersey, have invented certain new and useful Improvements in Screw-Thread-Milling Machines, of which the following is a specification.

My invention aims to provide a machine of this class in which the placing of the work in the machine and the cutting of the thread may be performed rapidly and accurately and the thread may be terminated at the desired point automatically and with great exactness. Other points of advantage are referred to hereinafter.

The accompanying drawings illustrate certain embodiments of the invention.

Figure 1 is a side elevation of a machine for threading rifle barrels, shells or similar work; Fig. 2 is a plan of the same; Fig. 3 is a transverse section on the line 3—3, Fig. 1; Fig. 4 is a longitudinal vertical section of the cutter carrier; Fig. 5 is a transverse section on the line 5—5, Fig. 1; Fig. 6 is a longitudinal vertical section through the feed nut and its carrier; Fig. 7 is a horizontal section through the same; Fig. 8 is an end view of the machine of Fig. 1; Fig. 9 is a longitudinal section of a machine specially designed for milling internal threads, as in shells or similar work; Fig. 10 is a plan of the same; Fig. 11 is an end view of the same.

Referring to the embodiments of the invention illustrated, and first to Figs. 1–7, the work consists of a long rifle barrel A on the reduced end B of which a thread is to be cut by means of a rotating milling cutter C. The drawing shows the parts in position just as the cutting operation is to commence. The work is carried in a hollow holder D in which it is clamped by the usual split tapered collet or any other usual or suitable means, a hand wheel E being rotated to clamp it. The holder rotates in bearings F and G fixed on the bed $r$ of the machine, being rotated by means of a worm gear H carried by the fixed bearing G and splined on the holder so as to permit the feeding of the latter and the work longitudinally. The gear H is driven by a worm J also mounted on the bearing G and driven by a belt pulley K.

The holder is normally held in the starting position by a weight L suspended by a rod L' from a lever M, M' whose upper arm M' carries a pivoted block $M^2$ which engages a collar $M^3$ on the holder and which arm M' has a flange N engaging an adjustable stop nut on a threaded pin O in the retracted position of the holder. The feeding movement of the holder is effected by means of a lead screw P mounted thereon and adapted to engage a nut Q when a feeding movement is to be made; the nut Q being movable into and out of engagement with the lead screw. The mounting of the feed nut is shown in Figs. 5, 6 and 7. The fed nut Q is not a complete circle, but extends only across the lower portion of the lead screw. It is mounted on a slide R which is adapted to move up and down on guides S formed on an upright block T fixed on the bed of the machine and constituting a bearing for a shaft U which carries an eccentric V engaging bearing plates W and X carried by the slide R. In Fig. 5 the eccentric is shown at its highest point, bringing the nut Q into full engagement with the screw P, and is stopped by an abutment Y provided on the slide R. When the parts are to be disconnected the shaft and eccentric are turned in the direction of the arrow by means hereinafter described. The shaft U passes also through a bearing Z (Figs. 2, 3 and 4) which is detachably bolted on the bed of the machine. A slide $a$ is arranged to move up and down on guides carried by the bearing block Z similar to the slides shown in Fig. 7. This slide $a$ supports a bearing $b$ for the cutter C, the bearing $b$ being adjustably fastened on the slide by means of bolts $c$ passing through slots $d$ in the head of the bearing $b$ and screwing into the face of the slide $a$. Adjusting screws or bolts $e$ pass upward through lugs on the face of the slide $a$ so as to facilitate the elevation of the cutter to the exact level desired in accordance with the work to be done. The shaft U carries an eccentric $f$ engaging bearing plates $g$ and $h$ of the slide $a$. The eccentric $f$ by which the cutter is raised into contact with the work is set at the same angle with the eccentric V by which the nut is brought into engagement with the lead screw to feed the work, and the two eccentrics are operated together by the shaft U.

The spindle $j$ of the cutter carries a sprocket wheel $k$ on its rear end which is driven by the chain $l$ (Fig. 2) running over a sprocket wheel on a driving shaft $m$ mounted in a suitable bearing $n$, and carrying at its end beyond the bearing a pair of pulleys $p$, $q$ for securing different rates of speed; the bearing $n$ having a base $o$ which is fastened adjustably on the supplementary bed $s$ at one side of the machine.

The bed $r$ of the machine and the bed $s$ which supports the bearing for the driving shaft $m$ extend somewhat beyond the position of the bearing block Z as shown in full lines so as to permit the machine to be adjusted for cutting an internal thread. For this purpose the bearing blocks Z and $n$ may be shifted to the positions shown in dotted lines in Figs. 1 and 2. The beds $r$ and $s$ are provided with undercut grooves $r'$ and $s'$ for engaging the holding down bolts $r^2$ and $s^2$ which pass through the base of the bearing blocks. The spindle bearing $b$ for the cutter is replaced by a similar bearing $b'$ differing only that it stands at a higher level above the bed of the machine. The external cutter C is replaced by a small internal cutter $t$. The bearing carrying the shaft $m$ and pulleys $p$ and $q$ is shifted so as to bring the sprocket chain $l$ into line with the sprocket $k$ on the rear end of the cutter spindle. A supplementary work-holder $u$ is then fastened in the end of the main work-holder D and is provided with means for clamping a work-piece $v$, such for example as a receiver which is to be internally threaded on its end to receive the threaded end of the barrel A. With the machine adjusted in this way the work is fed and revolved and the cutter is brought into engagement with it and revolved by the same means and in the same way as for the work which is to be externally threaded.

The shaft U controls the starting and stopping and retracting of the work. It is provided with hand levers $w$ at suitable points in its length. The work having been clamped in the holder, one of these handles is pulled. This lifts an arm $x$ on the end of the shaft (Fig. 8) to which a weight $y$ is suspended by means of a rod $z$. When the shaft is turned so far that the arm $x$ swings just past its center further movement is prevented by the cam D striking the stop Y, and the weight $y$ holds the shaft in this position. The feed commences and the cutter engages the work as above explained. The work-holder has clamped on it and adjustable lengthwise thereon an arm 2 which carries a pin 3. The latter, therefore, rotates and advances with the work-holder. When the thread has been cut to exactly the desired point the pin 3 will by its spiral movement have advanced longitudinally past the end of a pin 4 on an arm 5 which is fixed on the shaft U and will strike the side of the pin 4 and, as pin 3 continues to rotate, will swing the arm 5 in the direction of the arrow in Fig. 5. As soon as the short movement necessary to turn the arm $x$ on the end of the shaft beyond its center is effected the weight $y$ quickly completes the turning of the shaft U, which is stopped at the desired point by the striking of the slide $a$ (Fig. 4) on an adjustable stop screw $a'$ screwing into the bed of the machine. The stopping of the forward feed of the work and the simultaneous removal of the cutter therefrom terminates the thread sharply at the desired point.

The machine illustrated in Figs. 1 to 8 is designed for turning out large quantities of identical work rapidly and the cutter spindle is, therefore, set once for all at an angle with the longitudinal axis of the work, depending upon the pitch of the threads to be cut; this angle may be for example about one degree. The machine may, however, be made so as to permit an adjustment of the angle to fit it for different classes of work. Figs. 9, 10 and 11 show a machine with this capacity for angular adjustment of the spindle of the cutter and show also certain other modifications in detail which may be separately applied to the machine of Figs. 1 to 8. The bolts $r^2$ which hold down the bearing block for the spindle by engagement with undercut grooves $r'$ in the bed $r$ of the machine pass through curved slots 6 in the base 7 of the bearing block so that the latter may be turned slightly about a vertical axis passing through the cutter $t$. The bearing block 8 carries a slide 9 which is raised and lowered by an eccentric on the shaft U as before and the bearing block 10 for the spindle of the cutter carries flanges 11 sliding in grooves in the slide 9 and by which it may be adjusted in said slide. The vertical adjustment of the bearing block 10 is effected by means of a screw 12 screwing through a flange on the side of the part 10 and entering a suitable opening in the slide 9 which limits its downward movement. By turning the screw 12 in one direction or the other the bearing 10 and the cutter are raised or lowered. The work in this case is a shell 13, the end of which is to be internally threaded and which is carried in a holder 14 rotating in a bearing 15 fixed to the bed of the machine and carrying a lead screw 16 operated as in the first construction described by means of a nut Q on a slide raised and lowered by means of an eccentric on the shaft U. The hand wheel E for clamping the work in the holder and the worm gear H fixed on the holder and driven by a worm J are also the same as in the construction of Fig. 1. The worm J, however, is driven in this case from a shaft 17 by means of a change speed gearing consisting of a removable pinion 18 (Fig. 11) which can be substituted by another pinion of a different size, and fixed pinions 19 and 20, the latter driving a shaft 21 whose movement is communicated through beveled pinions to the shaft of the worm J. The shaft 17 is mounted at the side of the machine and is used also for driving the sprocket chain $l$ by which the sprocket $k$ on the end of the cutter spindle is driven. The shafts 17 and U in this construction are made flexible to accommodate the slightly angular adjustment of the bearing 8 which carries the cutter. The shell 13 is introduced from the front end of the holder 14. In order to determine its position a stop is provided consisting of a nut $13^a$ adjustable on the end of a pin $13^b$ which passes through an opening in the base of the collet $13^c$ and is fastened in the body of the holder 14, so that the collet may be adjusted lengthwise without interference from the stop pin $13^b$. Instead of using a weight to retract the work-holder automatically as soon as the nut which coöperates with the lead screw is withdrawn, I have shown in this construction a hand lever for withdrawing the holder. This lever 22 is pivoted on the rear side of the machine and carries a pin 23 lying in a circumferential groove 24 in the work-holder. In this case after the turning of the shaft U at the end of the work, the operator shifts the handle 22 so as to retract the holder to its starting position and permit the withdrawal of the shell and the insertion of a new one. The shafe U is tripped at the end of the work by means of a nose 25 on the forward end of the holder which at the proper time strikes the shoulder 26 on the arm 27 which is splined on the shaft U and mounted on a bearing 28 held down by a bolt 29 engaging one of the slots $r'$ in the bed, so that the arm 27 may be adjusted along the shaft U in accordance with the length of the thread desired.

While the machine illustrated is specially designed for threading rifle barrels and receivers therefor and shells, yet it is adapted by suitable modifications in proportion and in details to be used for threading other classes of work. And though I have described with great particularity of detail certain modifications of the invention yet it is not to be understood therefrom that the invention is restricted to the particular machines illustrated.

Various modifications in detail and in the arrangement of the parts may be made by those skilled in the art without departing from the invention.

What I claim is—

1. A thread milling machine including in combination a work holder, a rotating cutter, means for bringing the cutter into engagement with the work, means for rotating the work holder continuously in one direction, means engaging the work holder for feeding it forward as it is rotated and automatic means for simultaneously disengaging the cutter from the work and disgaging the feeding means from the work engaging when the thread has been cut to a holder when the thread has been cut to a predetermined point while permitting a continued rotation of the work holder and cutter.

2. A thread cutting machine including in combination a work holder, a cutter, means for feeding the work to the cutter with a rotating and advancing movement, a cam for starting and stopping the feed, a cam for moving the cutter into and out of engagement with the work and a common shaft for operating both said cams.

3. A thread cutting machine including in combination a work holder, a cutter, means for feeding the work to the cutter with a rotating and advancing movement, a cam for starting and stopping the feed, a cam for moving the cutter into and out of engagement with the work and a common shaft for operating both said cams, said shaft having a hand-crank and a weighted crank adapted when swung in one direction past its center to hold the shaft in the feeding position and when swung in the opposite direction past its center to complete the movement of the shaft so as to stop the feed and disengage the cutter.

4. A thread cutting machine including in combination a work holder, a cutter, means for feeding the work to the cutter with a rotating and advancing movement, a cam for starting and stopping the feed, a cam for moving the cutter into and out of engagement with the work and a common shaft for operating both said cams, said shaft having a hand-crank and a weighted crank adapted when swung in one direction past its center to hold the shaft in the feeding position and when swung in the opposite direction past its center to complete the movement of the shaft so as to stop the feed and disengage the cutter, and means carried by the work holder for turning said crank in the latter direction at a determined point in the feed so as to stop the cutting operation exactly at the desired point.

5. A thread cutting machine including in combination a cutter, a rock shaft adapted to move the cutter into and out of engagement with the work, an arm on said shaft, yielding means connected to said arm for turning the shaft quickly in a direction to disengage the cutter from the work, said arm being swung slightly past its dead center and stopped there when the shaft is in position to engage the cutter with the work.

In witness whereof, I have hereunto signed my name.

ALFRED MORRIS THOMSON.